United States Patent
Croslin et al.

[11] Patent Number: 5,958,063
[45] Date of Patent: Sep. 28, 1999

[54] METHOD AND SYSTEM FOR PRE-PATCHING A COMMUNICATIONS NETWORK

[75] Inventors: William D. Croslin; Steven M. Sellers, both of Colorado Springs, Colo.

[73] Assignee: MCI Communications Corporation, Washington, D.C.

[21] Appl. No.: 08/884,710

[22] Filed: Jun. 30, 1997

[51] Int. Cl.[6] .............................. G06F 11/00; H04B 3/38; H04M 7/00; G01R 31/08
[52] U.S. Cl. .............................. 714/4; 370/228; 340/827; 379/221; 709/241; 709/244
[58] Field of Search ..................................... 370/216, 217, 370/218, 225, 228; 395/182.02, 200.71, 200.74; 340/827; 379/221; 709/241, 244; 714/4

[56] References Cited

U.S. PATENT DOCUMENTS

| | | |
|---|---|---|
| 4,577,066 | 3/1986 | Bimonte et al. . |
| 4,920,529 | 4/1990 | Sasaki et al. . |
| 5,187,740 | 2/1993 | Swaim et al. ........................... 379/209 |
| 5,335,268 | 8/1994 | Kelly, Jr. et al. ....................... 379/112 |
| 5,448,572 | 9/1995 | Knox et al. ......................... 395/182.02 |
| 5,459,716 | 10/1995 | Fahim et al. .............................. 370/16 |
| 5,463,615 | 10/1995 | Steinhorn . |
| 5,521,972 | 5/1996 | Iki ........................................... 395/221 |
| 5,636,203 | 6/1997 | Shah ....................................... 370/244 |
| 5,646,936 | 7/1997 | Shah et al. .............................. 370/228 |
| 5,787,271 | 7/1998 | Box et al. ............................... 395/500 |
| 5,850,505 | 12/1998 | Grover et al. ...................... 395/182.02 |

FOREIGN PATENT DOCUMENTS

| | | |
|---|---|---|
| 0 494 513 A2 | 12/1991 | European Pat. Off. . |
| WO9510149 | 4/1995 | United Kingdom . |
| WO9701143 | 1/1997 | United Kingdom . |
| WO 95/10149 | 4/1995 | WIPO . |

OTHER PUBLICATIONS

W.D. Grover and M.H. MacGregor, "Potential for spare capacity preconnection to reduce crossconnection workloads in mesh-restorable networks", Electronic Letters, vol. 30, No. 3, pp. 194–195, Feb. 1994.

M.H. MacGregor, W.D. Grover and K. Ryhorchuk, "Optimal Spare Capacity Preconfiguration for Faster Restoration of Mesh Networks", Journal of Network and Systems Management, vol. 5, No. 2, 1997, pp. 159–171, Jun. 1997.

W.D.Grover et al, "Near Optimal Spare Capacity Planning In A Mesh Restorable Network" IEEE Globcom 91, vol. 3, pp. 2007–2008, XP000313750.

Herzberg et al. "The Hop–Limit Approach for Spare–Capacity Assignment in Survivable NEtworks" IEEE Dec. 3, 1995.

Dighe, et al. "A Link Based Alternative Routing Scheme for Network Restoration under Failure" IEEE May 1995.

Grover et al. "Near Optimal Spare Capacity Planning in a Mesh Restorable Network" IEEE Jan. 1991.

(List continued on next page.)

*Primary Examiner*—Robert W. Beausoliel, Jr.
*Assistant Examiner*—Brian H. Shaw

[57] ABSTRACT

A method and system for pre-patching spare capacity into a communications network. The pre-patching system analyzes an original network configuration along with restoration plans that define restoral routes to bypass a network failure. The pre-patching system identifies existing spare connections in the original network configuration that can advantageously be destroyed from the original configuration so that their destroying can be avoided when implementing the restoration plans. The pre-patching system also identifies connections that do not exist in the original configuration and that can advantageously be created in the original network configuration to avoid the overhead of their creation when implementing the restoration plans.

11 Claims, 17 Drawing Sheets

OTHER PUBLICATIONS

Hasegawa et al. "Dynamic Reconfiguration of Digital Cross--Connect Systems with Network Control and Management-"IEEE.

Bellary, et al. "Intelligent Transport Network Survivability: Study of Distributed and Centralized Control Techniques" IEEE 1990.

Shimazaki et al. "Neopilot: An Integrated ISDN Fault Management System" IEEE Feb. 1990.

Shimazaki et al. "Network Fault Management"Sep. 1992.

Newport, et al. "Network Survivability Through Connectivity Optimization" IEEE 1987.

Flanagan et al. "Principles and Technologies for Planning Survivability—A Metropolitan Case Study", IEEE 1989.

M. Wehr "Protection of Synchronous Transmission Networks", Commutation and Transmission, No. 4, 1993.

Coan, et al. "Using Distributed Topology Update and Pre-planned Configurations to Achieve Trunk Network Survivability" IEEE Oct. 1991.

Manione et al. "An Inconsistencies Tolerant Approach in the Fault Diagnosis of Telecommunications Networks" Feb. 14, 1994.

Bouloutas, et al. "Alarm Correlation and Fault Identification in Communication Networks" Feb. 1, 1994.

| triplet | already exists? | number of times created | number of times destroyed | number of times used "as is" |
|---|---|---|---|---|
| 2 B 5    (22) | T |   | 1 |   |
| 3 B 10   (23) | T |   |   |   |
| 10 C 12  (24) | T |   |   |   |
| 5 D 8    (26) | T |   | 1 |   |
| 13 D 9   (27) | T |   |   |   |
| 1 B 5    (28) | F | 1 |   |   |
| 5 D 7    (29) | F | 1 |   |   |

FIG. 5

| triplet | already exists ? | number of times created | number of times destroyed | number of times used "as is" |
|---|---|---|---|---|
| 2 B 5    (22) | T |   | 1 | 1 |
| 3 B 10  (23) | T |   |   |   |
| 10 C 12 (24) | T |   |   |   |
| 5 D 8    (26) | T |   | 2 |   |
| 13 D 9  (27) | T |   |   |   |
| 1 B 5    (28) | F | 1 |   |   |
| 5 D 7    (29) | F | 2 |   |   |
|   |   |   |   |   |
|   |   |   |   |   |
|   |   |   |   |   |
|   |   |   |   |   |
|   |   |   |   |   |

FIG. 7

| triplet | already exists? | number of times created | number of times destroyed | number of times used "as is" |
|---|---|---|---|---|
| 2 B 5   (22) | T |  | 1 | 1 |
| 3 B 10  (23) | T |  |  | 1 |
| 10 C 12 (24) | T |  |  | 1 |
| 5 D 8   (26) | T |  | 2 |  |
| 13 D 9  (27) | T |  | 1 |  |
| 1 B 5   (28) | F | 1 |  |  |
| 5 D 7   (29) | F | 2 |  |  |
| 12 D 9  (30) | F | 1 |  |  |

FIG. 9

| triplet | already exists? | number of times created | number of times destroyed | number of times used "as is" |
|---|---|---|---|---|
| 2 B 5  (22) | T |  | 1 | 2 |
| 3 B 10 (23) | T |  |  | 1 |
| 10 C 12 (24) | T |  |  | 1 |
| 5 D 8  (26) | T |  | 3 |  |
| 13 D 9 (27) | T |  | 1 |  |
| 1 B 5  (28) | F | 1 |  |  |
| 5 D 7  (29) | F | 3 |  |  |
| 12 D 9 (30) | F | 1 |  |  |
|  |  |  |  |  |
|  |  |  |  |  |
|  |  |  |  |  |
|  |  |  |  |  |
|  |  |  |  |  |

FIG. 11

| triplet | already exists ? | number of times created | number of times destroyed | number of times used "as is" |
|---|---|---|---|---|
| 2 B 5    (22) | T |   | 1 | 2 |
| 3 B 10   (23) | T |   |   | 2 |
| 10 C 12  (24) | T |   |   | 2 |
| 5 D 8    (26) | T |   | 3 |   |
| 13 D 9   (27) | T |   | 1 |   |
| 1 B 5    (28) | F | 1 |   |   |
| 5 D 7    (29) | F | 3 |   |   |
| 12 D 9   (30) | F | 1 |   |   |
| 12 D 7   (31) | F | 1 |   |   |

FIG. 13

METHOD AND SYSTEM FOR PRE-PATCHING A COMMUNICATIONS NETWORK

CROSS-REFERENCE TO RELATED APPLICATIONS

This application is related to the U.S. patent applications entitled "Method and System for Assigning Spare Transmission Links To Restoral Routes" and "Method and System for Augmenting a Communications Network with Spare Capacity," which are being filed concurrently and are hereby incorporated by reference.

TECHNICAL FIELD

The present invention relates to communications networks and, in particular, to the restoration of communications networks following failures of a network component.

BACKGROUND OF THE INVENTION

Telecommunications carriers (e.g., long distance providers) continually strive to increase the reliability of their communications networks. They do this, in part, by increasing the speed by which they can restore network operation following failure in one or more components of the network. A communications network consists of a collection of transmission links, also known as segments, that are interconnected at network nodes. The segments include transmission lines, fiber optic cables, microwave links, and other such transmission medium. Traffic is transmitted on the network from one endpoint to another endpoint through a current route or "trunk," which is a network path of segments that interconnect the endpoints. The network nodes may serve a variety of functions such as amplifying the network traffic for transmission down the next segment in the route or establishing an interconnection between two segments connected to the node (i.e., a switch). Segments are interconnected by switching nodes to form "spans." The switching nodes can be controlled locally or from a remote computer system to connect or to disconnect segments that are connected to the node.

Unfortunately, the components (e.g., nodes and segments) of the communications network may occasionally fail. For example, a segment that is a buried fiber optic cable may fail as a result of being inadvertently severed by someone digging near the buried cable. If one or more of the cables fail, massive disruption of services to a large number of network customers could result. Therefore, telecommunications carriers strive to quickly and economically route the network traffic around such failed components by establishing a "restoral" route. A restoral route is a path between the endpoints that does not include the failed component. The establishing of a restoral route generally involves: (1) detecting that a component on the current route has failed, (2) identifying the location of the component, (3) selecting a restoral route to bypass the failed component, and (4) implementing the selected restoral route. The reliability of telecommunication networks depends in large part on the ability to detect such failures and implement the restoral route with minimal impact on network customers. A plan that identifies which switching nodes, also referred to as restoration nodes, are to be switched to bypass one or more specific failed components is called a "restoration plan."

Communications networks typically have excess capacity that can be used to bypass a failed component. The segments of a network that are currently being used to bear traffic are referred to as active segments, and the segments that are not being currently used to bear traffic (i.e., excess capacity) are referred to as spare segments. Spare segments that are currently connected to another to form a span are referred to as a spare span. Restoral routes are implemented by identifying spare segments and incorporating certain of those spare segments into the network. Telecommunications carriers desire to use restoral routes that minimize costs and that can be implemented rapidly when a network failure is detected. Telecommunications carriers typically consider the quality, capacity, and length of a restoral route as an indication of the cost of the restoral route. However, other costs, such as switching costs, are typically not considered. Switching costs are the costs associated with switching a restoration node to disconnect the failed segment and to connect spare segments to the non-failed active segments. In general, it is desirable to reduce the number of connections and disconnections (i.e., actions) when bypassing a failure. The number of connects and disconnects increases the time needed to implement a restoral route. Also, since an attempted connect or disconnect can fail, it is also desirable to reduce the number of connects and disconnects to reduce the chance of the implementation of the restoral route failing.

SUMMARY OF THE INVENTION

The present invention provides a method and system for determining an initial configuration for a communications network. The pre-patching system of the present invention retrieves various restoration plans for the network. Each restoration plan specifies restoral routes to bypass network failures. The pre-patching system then analyzes the retrieved restoration plans to identify an initial configuration of the network that reduces the cost of implementing some of the retrieved restoration plans. The pre-patching system then implements the identified initial configuration so that the cost of implementing a restoration plan is reduced.

More specifically, the pre-patching system determines a modification to an initial configuration of a communications network. The communications network has components that include active segments, spare segments, active connections that connect an active segment with another active segment, and spare connections that connect a spare segment with another segment. The pre-patching system then identifies three types of connections: to-be-created, to-be-used, and to-be-destroyed. The to-be-created connections need to be created to bypass a failed active segment. The to-be-used connections are existing spare connections that are used to bypass a failed active segment. The to-be-destroyed connections are existing spare connections that are destroyed to bypass a failed active segment. Based on the initial configuration of the communications network and on the identified to-be-created, to-be-used, and to-be-destroyed connections, the pre-patching system determines existing spare connections that should be destroyed and new connections that should be created to modify the initial configuration of the communications network to improve the performance of bypassing network failures.

BRIEF DESCRIPTION OF THE DRAWINGS

FIG. 5 illustrates the updates to the triplet table as a result of processing the restoration plan of FIG. 4.

FIG. 7 illustrates the updates to the triplet table as a result of processing the restoration plan of FIG. 6.

FIG. 9 illustrates the updates to the triplet table as a result of the restoration plan of FIG. 8.

FIG. 11 illustrates updates to the triplet table as a result of processing the restoration plan of FIG. 10.

FIG. 13 illustrates the updates to the triplet table as a result of processing the restoration plan of FIG. 12.

DETAILED DESCRIPTION OF THE INVENTION

Figure 1:
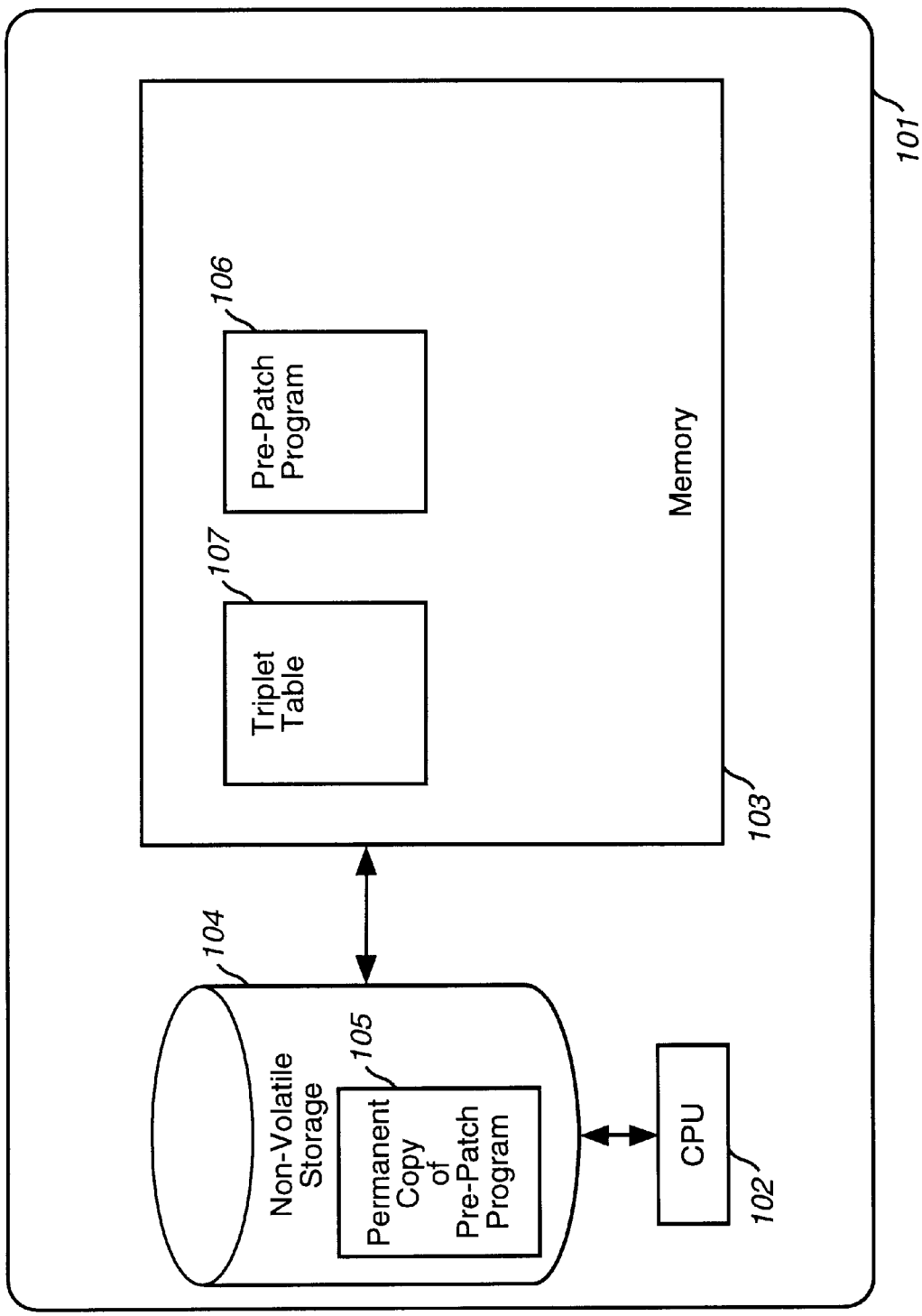
FIG. 1 is a block diagram of a generalized computer system for executing the pre-patching system.

The present invention provides a method and system for pre-patching a communications network in order to reduce the time required to implement a restoral route when a network component fails. The pre-patching system identifies new spare connections that if created and existing spare connections that if destroyed in the initial network configuration would improve the overall performance of building restoral routes. The pre-patching system then pre-patches the identified connections by creating or destroying those identified connections in the initial network configuration. When restoration plans are then implemented to bypass a failure, it is likely that the total number of connections that need to be created or destroyed is reduced because of the pre-patching. Thus, the overall performance of implementing the restoration plans would improve. The pre-patching system determines which connections to create or destroy by analyzing the restoration plans that have been developed to bypass various failures that could occur in the communications network. The pre-patching system counts the total number of times each connection would be created, destroyed, or used "as is" if each restoration plan was implemented to bypass a failure in the initial network configuration. If a certain connection is used "as is" or created in a large number of restoration plans, but only destroyed in a few restoration plans, then the pre-patching system would ensure that this connection is left "as is" or created. If a certain connection is destroyed in a large number of restoration plans, but only used "as is" or created in a small number of restoration plans, then the pre-patching system would ensure that the connection is destroyed in the initial network configuration. More generally, the pre-patching system of the present invention counts the number of times that each connection is needed by the restoration plans and counts the number of times that each connection would conflict with a restoration plan. A connection conflicts with a restoration plan if it would need to be destroyed to implement the restoration plan. The pre-patching system then selects a set of connections to create or destroy which would reduce the overall number of actions needed to implement the restoration plans. The pre-patching system may also use factors other than the counts to determine the set of connections to create or destroy. For example, certain network failures may occur more frequently than others. Thus, the restoration plan to bypass these failures would be implemented more frequently than other restoration plans. The pre-patching system may assign a weighting factor to each restoration plan to account for its expected frequency of implementation. Thus, even though a connection may be used by only one restoration plan, if that restoration plan is expected to be implemented frequently, then it may be advantageous for the pre-patching system to create that connection initially. Also, certain restoration plans may be used to restore failures in high priority trunks. These restoration plans may also be assigned a weighting factor that is based on the priority in this way, high priority trunks could be restored more quickly because the needed connections have already been created or destroyed.

FIG. 1 is a block diagram of a generalized computer system for executing the pre-patching system. The computer system 101 includes a central processing unit 102, a memory 103, and a storage device 104 (e.g., a hard disk drive). The pre-patching system, implemented as a pre-patching program 105, is stored on the storage device within the computer system. The pre-patching program, or portions thereof, are transferred to an in-memory copy of the pre-patching program 106 that comprises instructions that direct the CPU to perform the pre-patching analysis based on the original network configuration and on restoration plans. Intermediate data generated during pre-patching analysis is stored in a triplet table 107 in the memory of the computer. The triplet table contains the total count of the number of times a connection is used "as is," created, or destroyed by the restoration plans.

Figure 2:
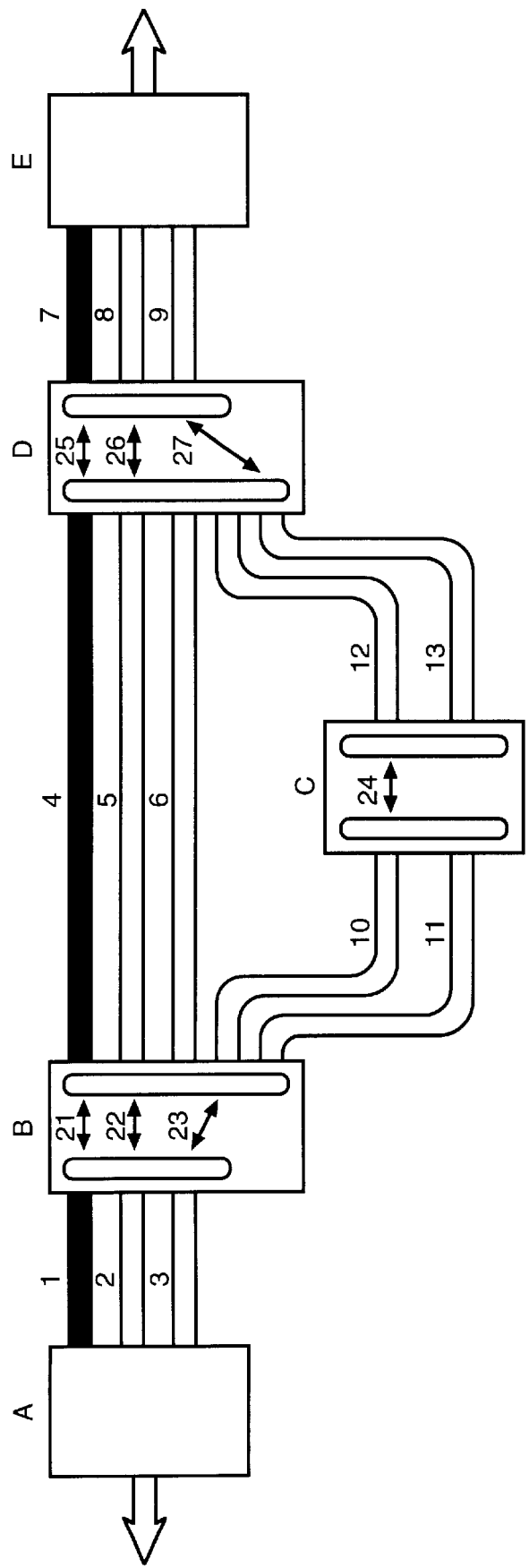
FIG. 2 illustrates the original configuration of a communications network.

FIGS. 2–13 are diagrams illustrating an example pre-patching analysis. FIG. 2 illustrates the original configuration of a communications network. The communications network includes restoration nodes A–E. Node A represents one endpoint of the communications network and node E represents the other end of the communications network. The communications network includes three active segments 1, 4, and 7. These three active segments are connected together through restoration nodes B and D to form the trunk for the communications network. In other words, as originally configured, all network traffic is transmitted through segments 1, 4, and 7. The example communications network further includes eight spare segments 2, 3, 5, 6, and 8–13. Restoration node B contains three connections 21–23. Connection 21 connects segment 1 to segment 4. Because segment 1 and segment 4 are active segments, connection 21 is an active connection. Connections 22 and 23 connect spare segments 2 and 5, and spare segments 3 and 10, respectively, and are therefore spare connections. Each connection is identified by a "triplet" that specifies segments and the interconnecting node. For example, the triplet "1B4" identifies connection 21, and triplet "3B10" identifies connection 23. Restoration node C contains a single spare connection 24, which connects spare segment 10 to spare segment 12. Restoration node D contains three connections 25–27. Connection 25 connects active segment 4 with active segment 7 and is therefore an active connection. Connections 26 and 27 connect spare segments 5 and 8 and spare segments 13 and 9, respectively, and are therefore spare connections. The spare segments 2, 3, 5, 6, and 8–13 and the spare connections 22–24 and 26–27 represent the spare capacity of the example communications network.

Figure 3:
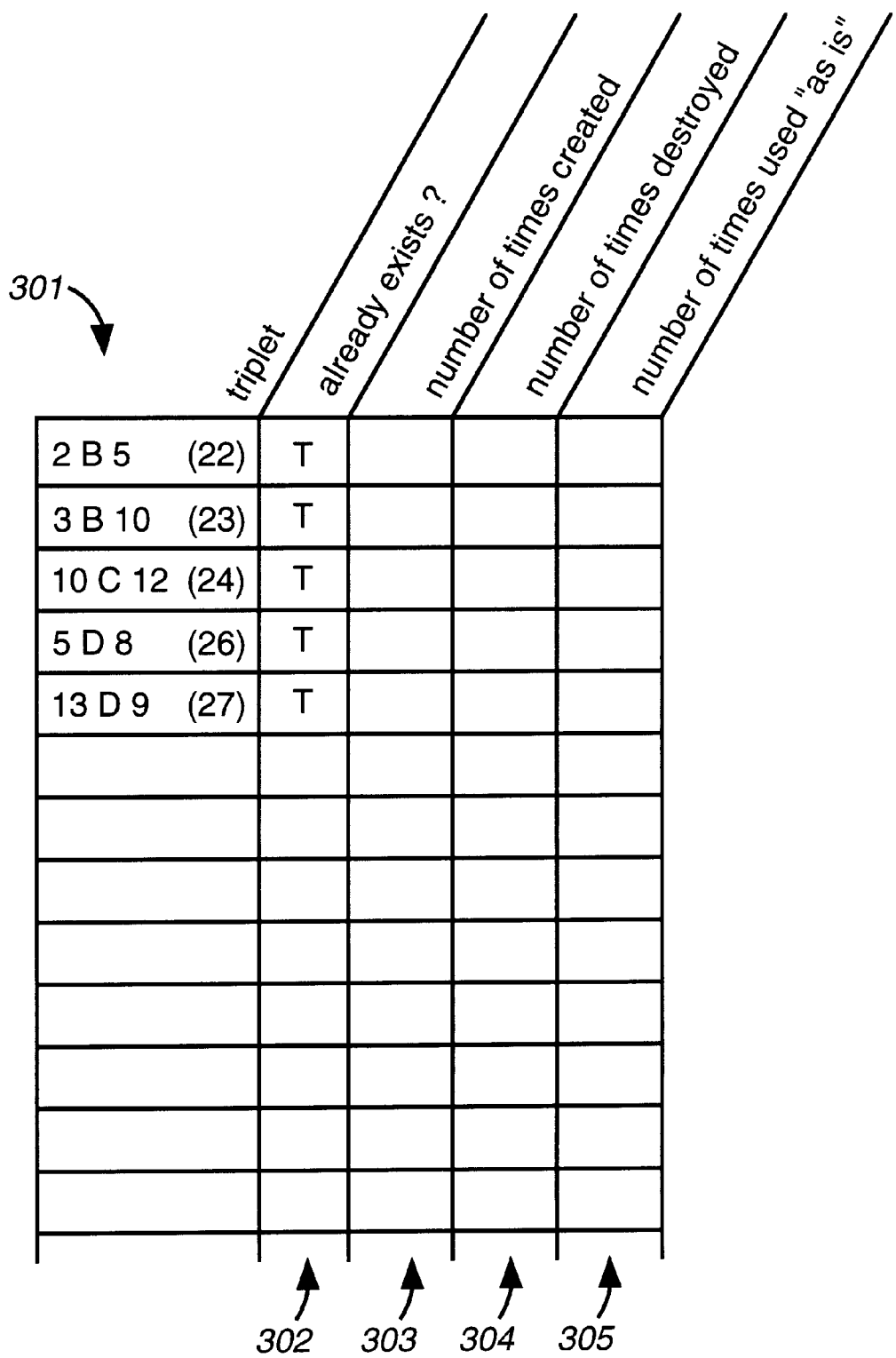
FIG. 3 illustrates a triplet table that contains intermediate results of the pre-patching system.

FIG. 3 illustrates a triplet table that contains intermediate results of the pre-patching system. Each row in the triplet table represents a spare connection that exists in the original configuration of the network or a new connection that is created by a restoration plan. The pre-patching system uses the triplet table to track the count of the number of times each connection is created, destroyed, or used "as is" in the restoration plans. The triplet column 301 contains the triplets that identify the various connections. The connection numbers are shown in parenthesis (e.g., "2B5 (22)"). The "already exists" column 302 contains a Boolean value, "T" or "F," indicating whether the connection represented by the triplet existed in the original configuration of the communications network. The "number of times created" column 303 contains a count of the number of times the connection was created in the restoration plans. The "number of times destroyed" column 304 contains a count of the number of times the connection was destroyed in the restoration plans. The "number of times used 'as is'" column 305 contains a count of the number of times the existing spare connection is used "as is" in the restoration plans.

The pre-patching system initially identifies all existing spare connections within the original configuration of the communications network and adds a row for each identified spare connection to the triplet table. The triplet table corresponding to the example communications network thus initially contains five rows, one for each spare connection. Since each spare connection exists in the original network communications, the "already exists" column has the value "T" for each row.

The pre-patching system then analyzes the restoration plans that have been developed to reconfigure the network using spare segments to bypass network failure. The restoration plans may also indicate restoral routes that would likely be implemented if the restoral routes are identified dynamically at the time of failure by a dynamic restoration system. In this analysis of restoration plans, the pre-patching system identifies each existing spare connections that is used "as is," each existing spare connection that is destroyed, and each new connection that is created. A row for each identified connection is added to the triplet table (if one does not already exist). For each identified connection, the pre-patching system increments the counts appearing in the appropriate columns of the row of the triplet table corresponding to the identified connection. For example, if a restoration plan indicates that a new connection is to be created, then the "number of times created" column for the row corresponding to the new connection is incremented.

Figure 4:
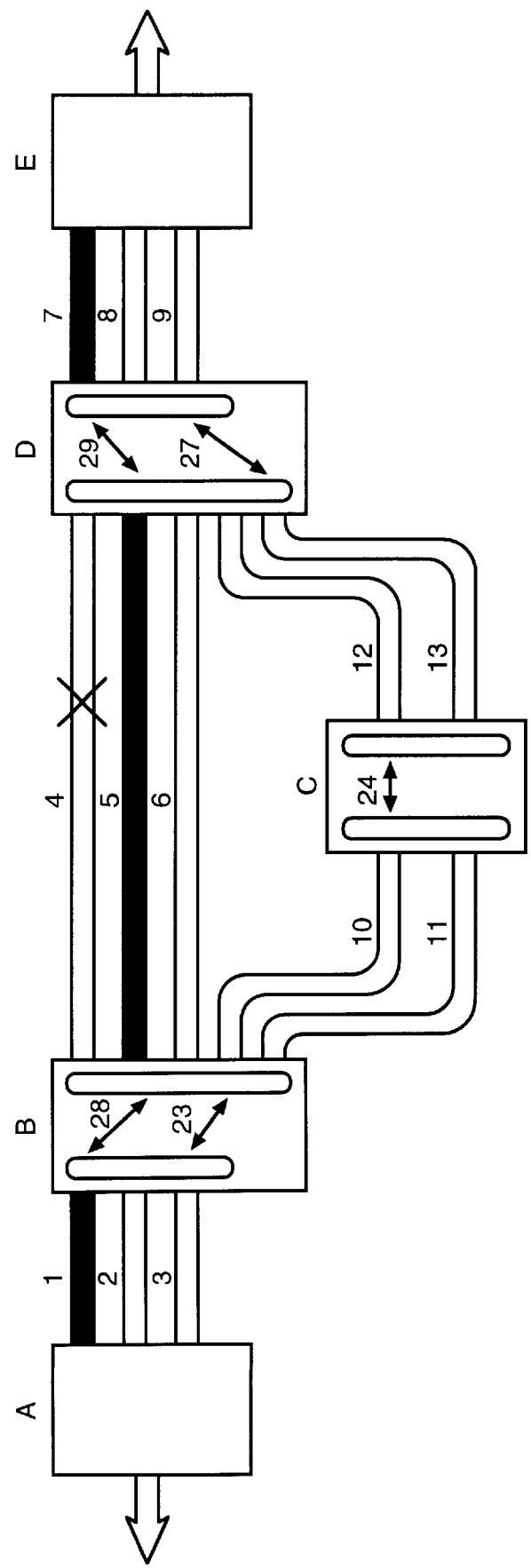
FIG. 4 illustrates an example restoration plan that bypasses segment 4.

FIG. 4 illustrates an example restoration plan that bypasses segment 4. This restoration plan represents the restoral route comprising active segment 1, spare segment 5, and active segment 7. The restoration plan creates two new connections 28 and 29, in order to incorporate spare segment 5 into the restoral route and destroys two connections 22 and 26 that existed in the original configuration. FIG. 5 illustrates the updates to the triplet table as a result of processing this restoration plan. The two new connections 28 and 29 are identified by triplets "1B5" and "5D7," respectively. The pre-patching system adds new rows for these connections to the triplet table. The pre-patching system sets the "number of times created" column for these new rows to 1 since this is the first restoration plan that has been processed in which these connections are created. Existing connections 22 and 26 are identified by the triplets "2B5" and "5D8," respectively. The triplet table already contains rows for these connections. The pre-patching system sets "number of times destroyed" column to 1 since this is the first restoration plan in which the connections are destroyed.

Figure 6:
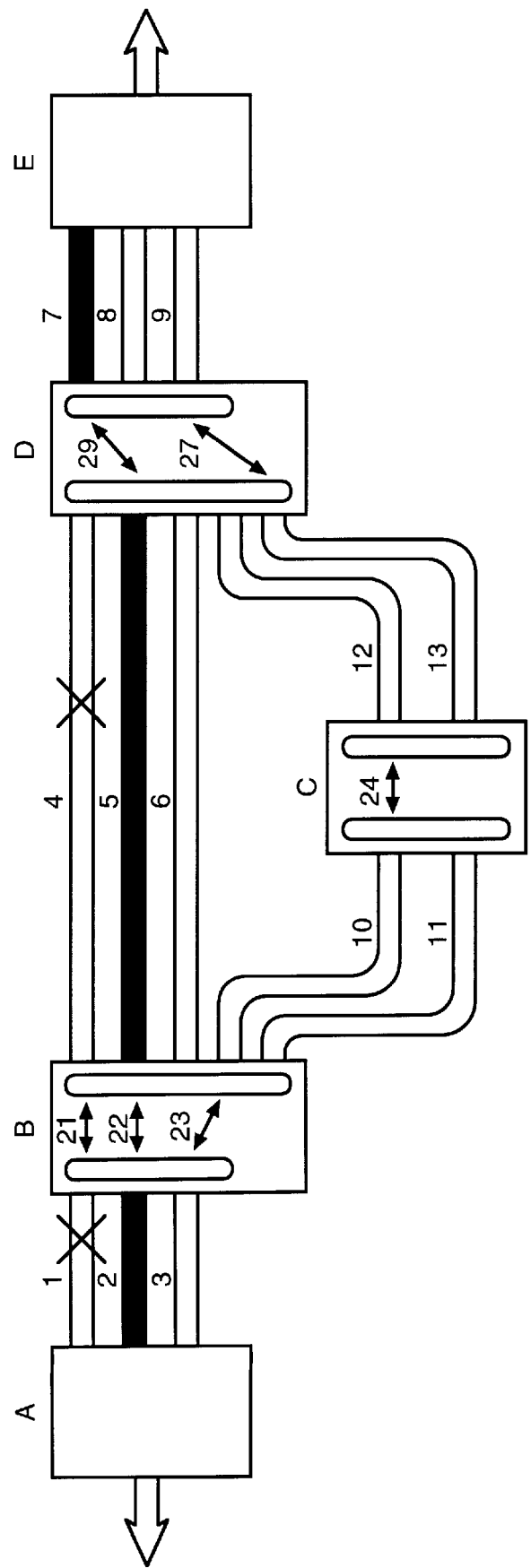
FIG. 6 illustrates a second restoration plan that bypasses active segments 1 and 4.

FIG. 6 illustrates a second restoration plan that bypasses active segments 1 and 4. This restoration plan represents the restoral route comprising spare segments 2 and 5, and active segment 7. The restoration plan uses existing connection 22 "as is," creates new connection 29, and destroys existing spare connection 26. Although the restoration plan would also destroy connection 25, since it is an active connection, it must be included in the initial configuration and thus is not considered as a connection that can be destroyed. FIG. 7 illustrates the updates to the triplet table as a result of processing this restoration plan. The pre-patching system increments the "number of times used 'as is'" column for the row corresponding to triplet "2B5" to 1. The pre-patching system increments the "number of times created" column for the row corresponding to triplet "5D7" to 2. The pre-patching system increments the "number of times destroyed" column for the row corresponding to triplet "5D8" to 2.

Figure 8:
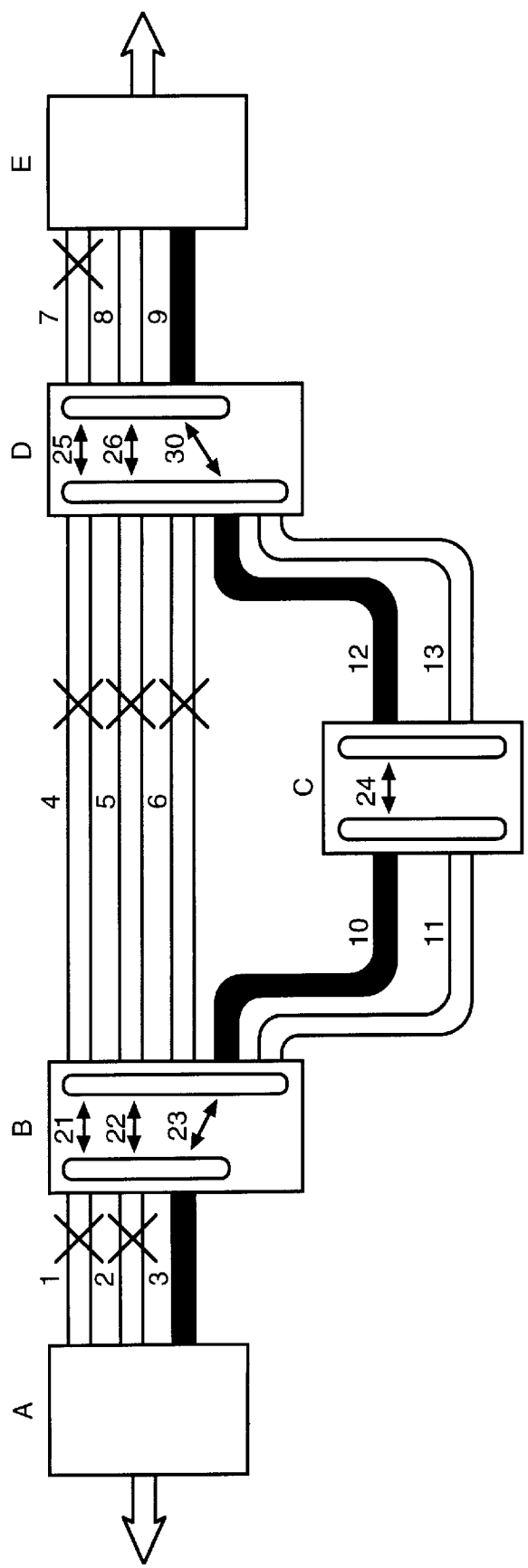
FIG. 8 illustrates a third restoration plan that bypasses segments 1, 2, and 4–7.

FIG. 8 illustrates a third restoration plan that bypasses segments 1, 2, and 4–7. This restoration plan represents the restoral route comprising spare segments 3, 10, 12, and 9. The restoration plan uses the existing connections 23 and 24 "as is," destroys the existing connection 27, and creates the new connection 30. FIG. 9 illustrates the updates to the triplet table as a result of this restoration plan. The new connection 30 is identified by triplet "12D9." The pre-patching system adds a new row for the new connection 30 to the triplet table. The pre-patching system sets the "number of times created" column for the new row to 1. The pre-patching system also increments the "number of times used 'as is'" column for connections 23 and 24 and the "number of times destroyed" column for connection 27 to 1.

Figure 10:
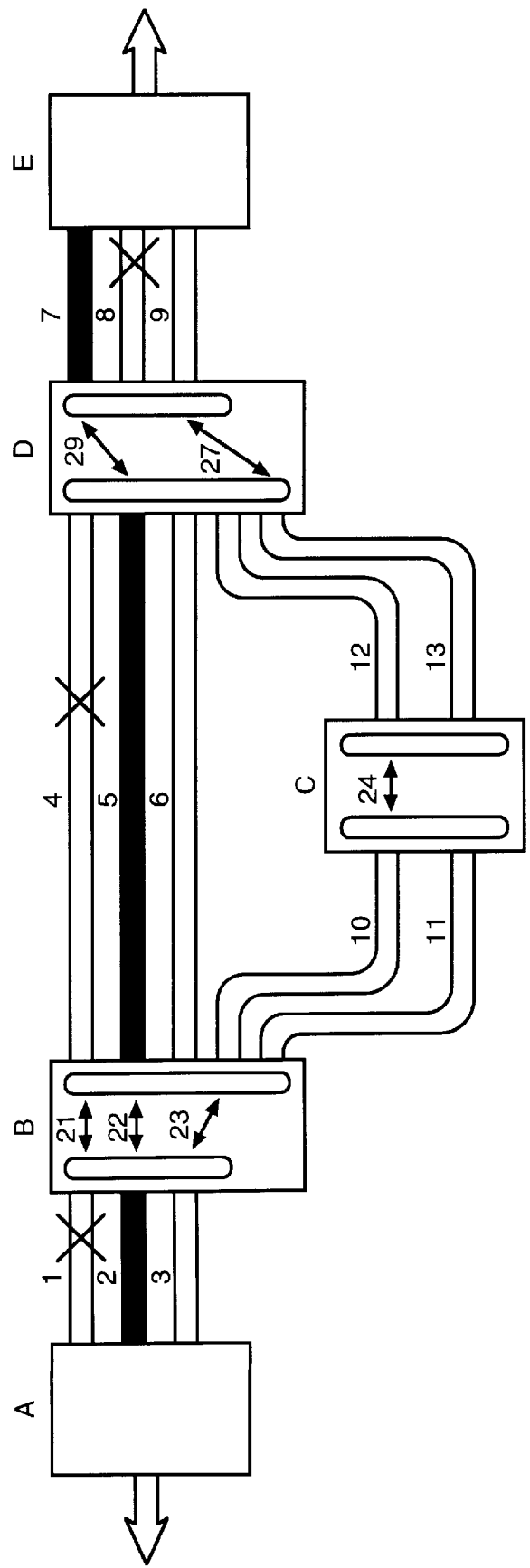
FIG. 10 illustrates a fourth restoration plan that bypasses segments 1 and 4.

FIG. 10 illustrates a fourth restoration plan that bypasses segments 1 and 4. The restoration plan represents a restoral route comprising spare segments 2 and 5, and active segment 7. The restoration plan uses the existing connection 22 "as is," creates new connection 29, and destroys connection 26. FIG. 11 illustrates updates to the triplet table as a result of processing this restoration plan. The pre-patching system increments the "number of times used 'as is'" column for connection 22 to 2, increments the "number of times created" column for connection 29 to 3, and increments the "number of times destroyed" column for connection 26 to 3.

Figure 12:
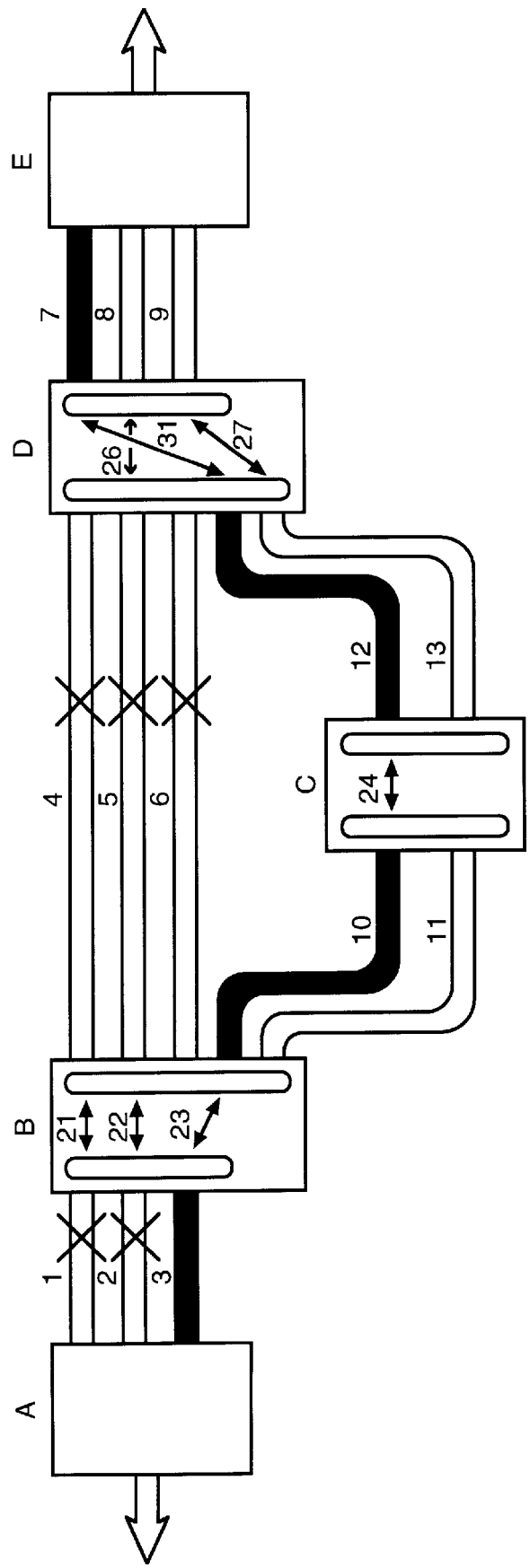
FIG. 12 illustrates a final restoration plan that bypasses segments 1, 2, and 4–6.

FIG. 12 illustrates a final restoration plan that bypasses segments 1, 2, and 4–6. The restoration plan represents a restoral route comprising spare segments 3, 10, and 12, and active segment 7. The restoration plan uses the spare connections 25 and 26 "as is" and creates a new connection 31. FIG. 13 illustrates the updates to the triplet table as a result of processing this restoration plan. The pre-patching system adds a row for the new connection 31 and sets the "number of times created" column to 1 for that row. The pre-patching system also increments the "number of times used 'as is'" column for connections 23 and 24 to 2.

The final triplet table indicates that connection 26 was destroyed three times in the five restoration plans and that connection 26 was never used "as is." Therefore, connection 26 would be a prime candidate to be destroyed in the initial configuration. In this way, the time-consuming task of destroying this connection is avoided when the restoration plans that destroy the connection are implemented in response to network failures. Since connection 25 is never used in a restoration plan, there is no reason for it to be included in the original configuration of the network. Conversely, connection 29 is created in three of the five restoration plans.

Figure 14:
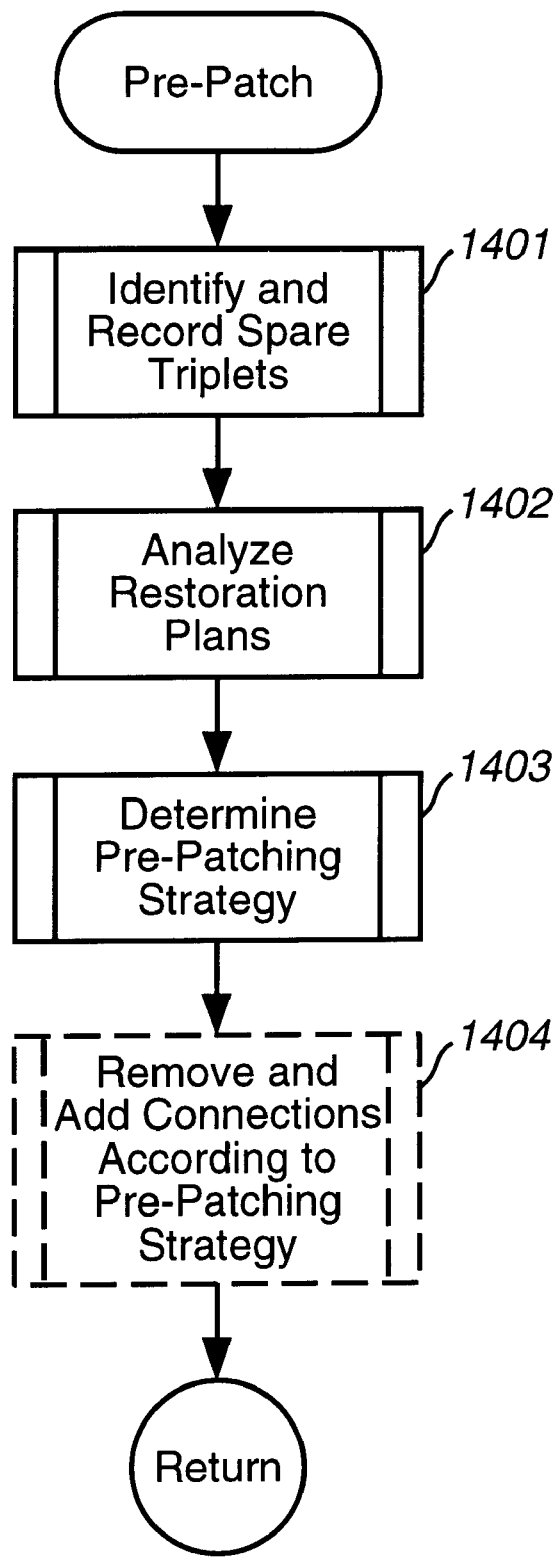
FIG. 14 is a control flow diagram for an implementation of the pre-patching program.

FIG. 14 displays a control flow diagram for an implementation of the "pre-patching" program. This program generates the triplet table and determines which connections should be created or destroyed in the initial configuration. In step 1401, the program identifies the spare connections that exist in the original network configuration and records the identified connections in the triplet table. In step 1402, the program analyzes the restoration plans provided as input to the program in the manner illustrated in the example above with cumulative results of the analyses stored in the triplet table. In step 1403, the program analyzes the cumulative results stored in the triplet table and proposes modifications to the original network configuration, including creating new connections and destroying existing spare connections. In the optional step 1404, the program implements these proposed modifications by sending appropriate configuration signals to the affected restoration nodes.

Figure 15:
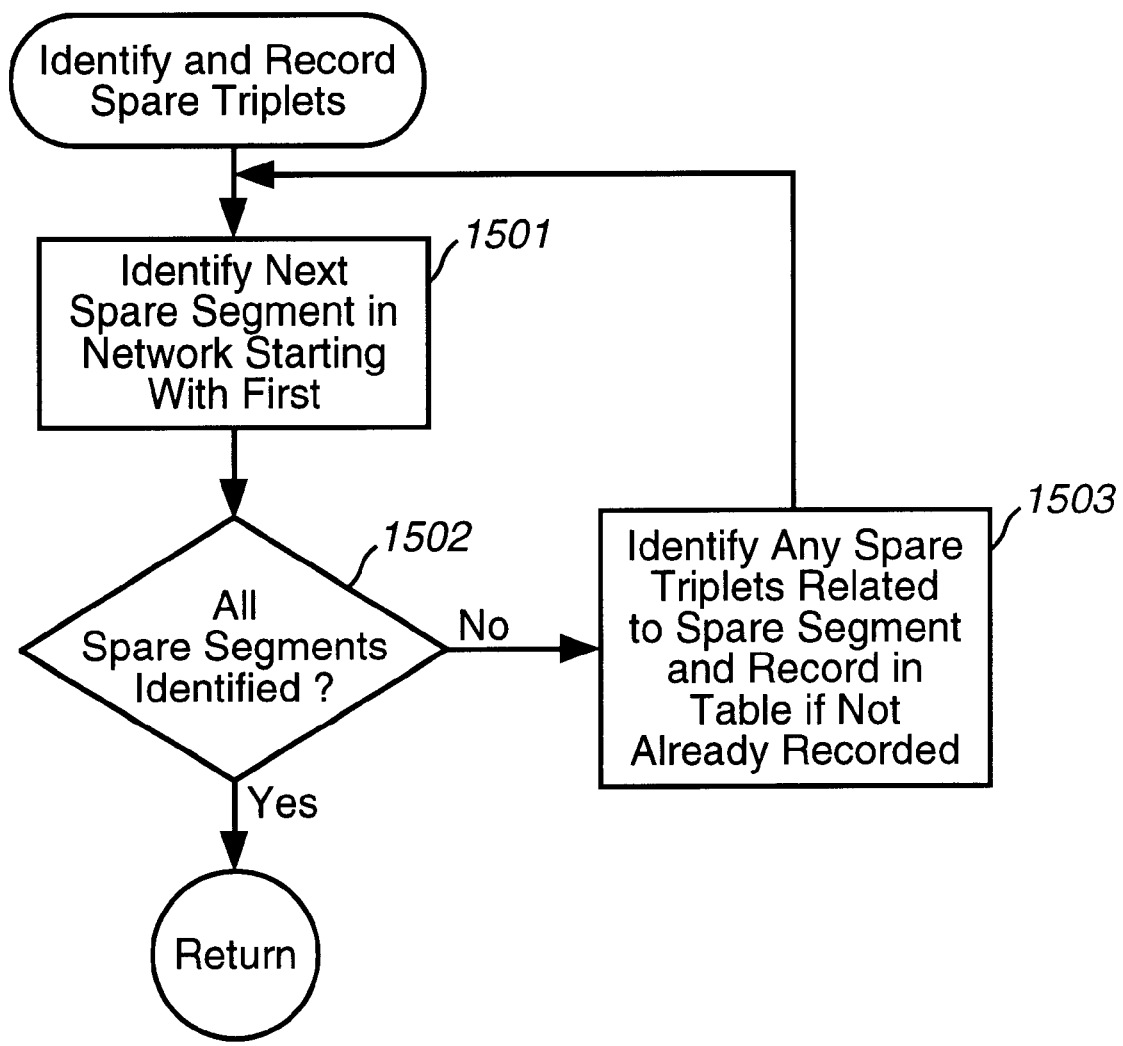
FIG. 15 is a control flow diagram for an implementation of a routine that identifies spare triplets.

FIG. 15 is a flow control diagram for a routine that identifies spare triplets. This routine identifies and records in the triplet table existing spare connections in the original network configuration. In step 1501, the routine identifies the next spare segment in the original network configuration starting with the first spare segment. In step 1502, if all the spare segments have already been identified, then the routine returns, else the routine continues at step 1503. In step 1503, the routine records any spare triplets related to the identified spare segment in the triplet table if they have not already been previously added to the triplet table and loops to step 1501 to identify the next spare segment in the original network configuration.

Figure 16:
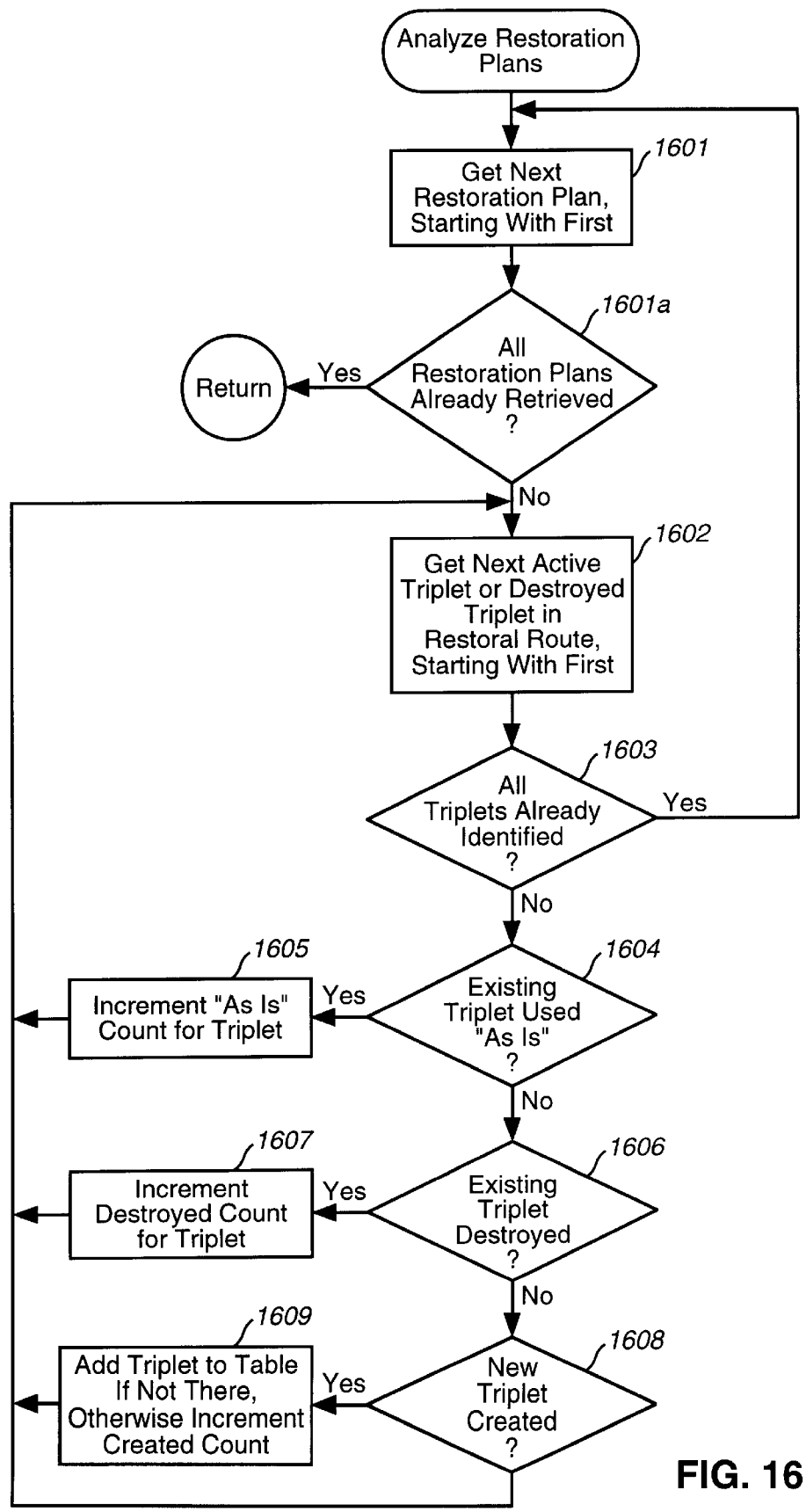
FIG. 16 is a control flow diagram of an implementation of a routine that analyzes the restoration plans.

FIG. 16 is a control flow diagram of an implementation of a routine that analyzes the restoration plans. The routine analyzes the restoration plans provided as input and suggests connections that should be created or destroyed in the initial configuration. In steps 1601–1609, the routine loops selecting and processing each restoration plan. In step 1601, the routine retrieves the next restoration plan starting with the first. In step 1601a, if all the restoration plans have already been retrieved, then the routine returns, else the routine continues at step 1602. In step 1602, the routine identifies the next triplet in the restoral route represented by the retrieved restoration plan, starting with the first triplet. In step 1603, if all the triplets have already been identified, then the routine loops to step 1601 to retrieve the next restoration plan, else the routine continues at step 1604. In steps 1604, 1606, and 1608, the routine determines whether the identified triplet is used "as is," destroyed, or created by the retrieved restoration plan. In step 1604, if the identified triplet represents a spare connection used "as is," then in step 1605, the routine increments the "number of times used 'as is'" column for that triplet. In step 1606, if the identified triplet is an existing spare connection that has been destroyed, then in step 1607, the routine increments the "number of times destroyed" column for that triplet. In step 1608, if the identified triplet is a newly created connection, then in step 1609, the routine adds a row for the identified triplet to the triplet table if a row for that triplet has not already been added. The routine then increments the "number of times created" column for the row corresponding to that triplet.

Figure 17:
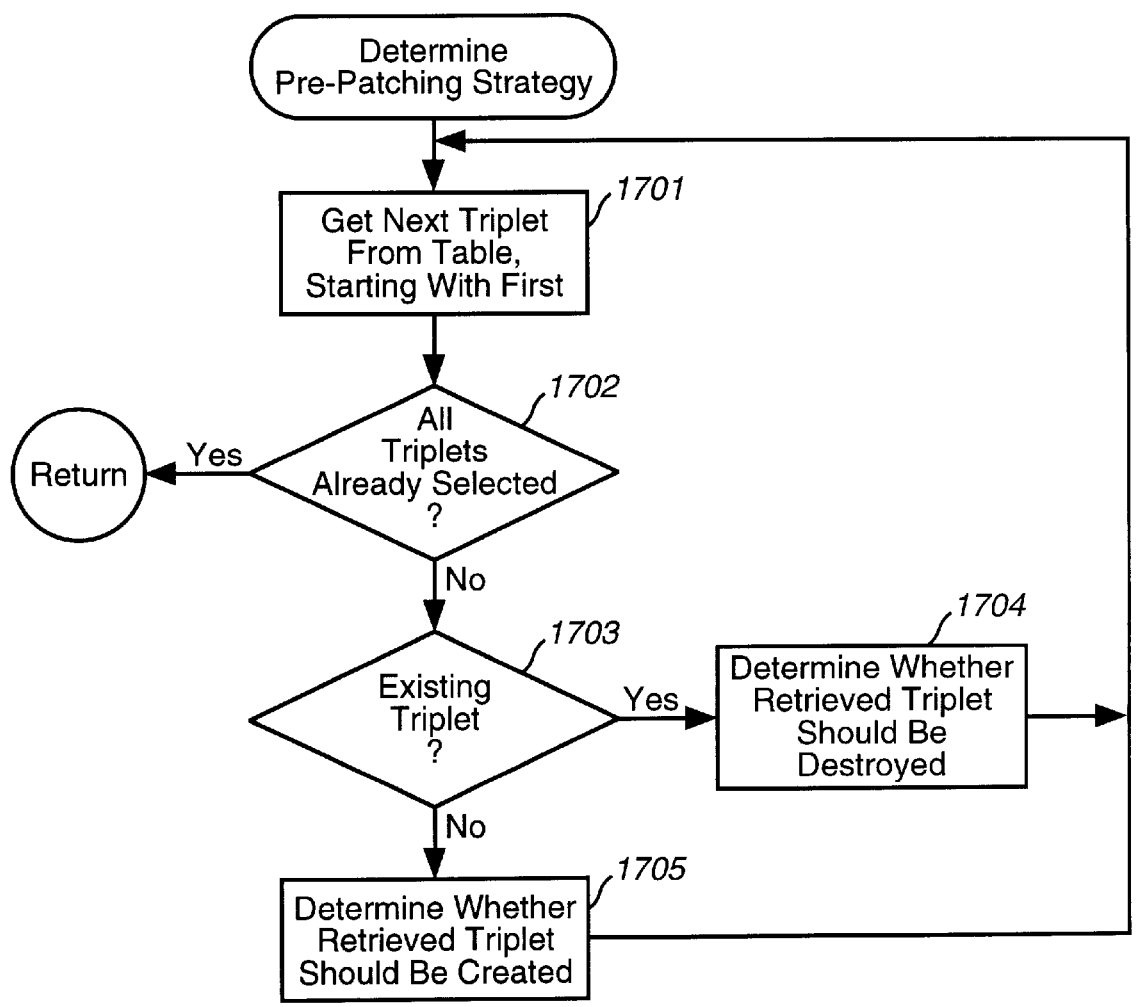
FIG. 17 is a flow control diagram of an implementation of a routine that determines which connections to create and destroy.

FIG. 17 is a flow control diagram of an implementation of a routine that determines which connections to create and destroy. This routine determines which connections to create and destroy based on the cumulative results of the analysis of the restoration plan stored in the triplet table. In step 1701, the routine retrieves the next triplet from the triplet table, starting with the first triplet in the table. In step 1702, if all the triplets have already been retrieved, then the routine returns, else the routine continues at step 1703. In step 1703, if the connection represented by the retrieved triplet is an existing spare connection, then the routine continues at step 1704, else the routine continues at step 1705. In step 1704, the routine analyzes the counts stored in the triplet table for the retrieved triplet to determine whether that spare connection should be destroyed in the original network configuration or whether that spare connection should remain "as is" in the original network configuration. In step 1705, the routine analyzes the counts stored in the triplet table for the retrieved connection to determine whether the connection should be created in the original network configuration.

The determination as to whether an existing spare connection should be destroyed or left "as is" can be made in many different ways. For example, the pre-patching system can divide the counts of the number of times an existing spare triplet is destroyed and used "as is" by the total number of restoration plans analyzed. This gives a percentage of times that that connection was destroyed and was used "as is." These percentages can then be matched against threshold percentages to make the determination of whether to destroy or retain the connection. Thresholds can be established by any number of factors, including the cost of destroying connections. The priorities of traffic restored by a restoration plan can also be factored into the analysis. For instance, if a given existing spare connection is destroyed 60% of the time, but always for low priority traffic, and is used "as is" 20% of the time, but always for high priority traffic, then the thresholds and the method of comparing computed percentages to thresholds may indicate that it is better to retain that existing spare connection than to destroy it, despite that it is destroyed far more often than it is used "as is" on a purely percentage basis. The determination as to whether to create a spare connection can also be made in various ways. For example, if the percentage of the restoration plans that create the spare connection exceeds a pre-determined threshold, the connection should be created in the initial configuration. Also, as described previously, the counts in the triplet table can be weighted based on the anticipated frequency in which a restoration plan is used and based on priority of the trunk that has failed.

Although the present invention has been described in terms of one embodiment, it is not intended that the invention be limited to this embodiment. Modifications within the spirit of the invention would be apparent to those skilled in the art. For example, the present invention can be used to propose an original configuration for any type of communications network (e.g., Internet or other computer-based network). The scope of the present invention is defined by the claim is that follow.

We claim:

1. A method in a computer system for analyzing spare capacity in a communications network to determine a pre-patching strategy for configuring the communications network prior to communications network failure, the communications network having active segments and spare segments and connections that connect segments together, wherein active segments carry communication signals through the communications network and wherein spare segments do not carry communications signals, but can be made to carry communications signals by connecting them to active segments, an active connection connecting active segments, a spare connection connecting a spare segment to another segment, the method comprising:

identifying existing spare connections within the communications network;

analyzing restoration plans for restoring the communications network after a failure is detected to determine the usage of connections in the restoration plans, a restoration plan having indications of creation of new connections, of use of existing spare connections, and of destruction of existing spare connections to bypass the network failure;

using the determined usage to generate the pre-patching strategy that indicates which existing spare connections should be destroyed and which spare connections should be created prior to communications network failure, and wherein ratios of number of times an existing spare connection is used in a restoration plan to the total number of restoration plans analyzed, and number of times an existing spare connection is destroyed in a restoration plan to the total number of restoration plans analyzed, are calculated and compared to corresponding threshold values to determine the pre-patching strategy.

2. The method of claim 1 wherein the determined usage includes a count of the number of times each identified existing spare connection is used and destroyed in the analyzed restoration plans and the number of times each new connection is created in the restoration plans.

3. The method of claim 1 wherein the communications network is configured in accordance with the generated pre-patching strategy.

4. A method in a computer system for determining an initial configuration for a communications network, the method comprising:

retrieving a plurality of restoration plans for the network that specify restoral routes to bypass network failures;

analyzing the retrieved plurality of restoration plans to identify an initial configuration of the network that reduces the cost of implementing some of the retrieved restoration plans, wherein analysis of the restoration plans further includes counting new connections that are created by the retrieved restoration plans and counting the number of times that existing spare connections are used and destroyed by the retrieved restoration plans, calculating percentages for each existing spare connection by dividing the counts of the number of times the existing spare connection is used and destroyed in the retrieved restoration plans by the number of retrieved restoration plans and percentages are calculated for each new connection by dividing the count of the number of times the new connection is created in the retrieved restoration plans by the number of retrieved restoration plans, and comparing said percentages to predetermined thresholds; and implementing the identified initial configuration so that the cost of implementing a restoration plan is reduced.

5. The method of claim 4 including analyzing the current configuration to identify the initial configuration.

6. The method of claim 4 wherein the analyzing of the restoration plan uses a weight factor based on the frequency in which the restoration plan is expected to be used.

7. The method of claim 4 wherein the analyzing of the restoration plans uses a weighting factor that is based on the priority of a failed component.

8. A computer system for determining an initial configuration for a communications network, the computer system comprising:

a component to retrieve a plurality of restoration plans for the network that specify restoral routes to bypass network failures;

a component to analyze the retrieved plurality of restoration plans to identify an initial configuration of the network that reduces the cost of implementing some of the retrieved restoration plans, the analyzing including reviewing connections that are created, destroyed, and used "as is", wherein analysis of the restoration plans includes counting new connections that are created by the retrieved restoration plans and counting the number of times that existing spare connections are used and destroyed by the retrieved restoration plans, calculating percentages for each existing spare connection by dividing the counts of the number of times the existing spare connection is used and destroyed in the retrieved plans by the number of retrieved restoration plans, calculating percentages for each new connection by dividing the count of the number of times the new connection is created in the retrieved restoration plans by the number of retrieved restoration plans, and comparing the calculated percentages to predetermined thresholds; and a component to implement the identified initial configuration so that the cost of implementing a restoration plan is reduced.

9. The computer system of claim 8 including analyzing the current configuration to identify the initial configuration.

10. The computer system of claim 8 wherein the analyzing of the restoration plan uses a weighting factor based on the frequency in which the restoration plan is expected to be used.

11. The computer system of claim 8 wherein the analyzing of the restoration plans uses a weighting factor that is based on the priority of a failed component.

* * * * *